(12) United States Patent
Han (10) Patent No.: US 10,845,649 B2
(45) Date of Patent: Nov. 24, 2020

(54) LIQUID CRYSTAL DISPLAY DEVICE

(71) Applicant: LG Display Co., Ltd., Seoul (KR)

(72) Inventor: HongGyu Han, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 166 days.

(21) Appl. No.: 15/152,763

(22) Filed: May 12, 2016

(65) Prior Publication Data

US 2017/0010500 A1    Jan. 12, 2017

(30) Foreign Application Priority Data

Jul. 7, 2015   (KR) .......................... 10-2015-0096419

(51) Int. Cl.
*G02F 1/1339* (2006.01)
*G02F 1/1345* (2006.01)
*G02F 1/1333* (2006.01)

(52) U.S. Cl.
CPC .......... *G02F 1/1339* (2013.01); *G02F 1/1345* (2013.01); *G02F 1/13338* (2013.01); *G02F 1/133345* (2013.01)

(58) Field of Classification Search
CPC ... G02F 1/13338; G02F 1/1345–13458; G02F 1/1337; G02F 1/161; G02F 1/0107;
(Continued)

(56) References Cited

U.S. PATENT DOCUMENTS 7,154,578 B2 * 12/2006 Kim ...................... G02F 1/1339
349/153

2001/0000676 A1    5/2001  Zhang et al.
(Continued)

FOREIGN PATENT DOCUMENTS

CN        1782785 A      6/2006
CN      101082745 A     12/2007
(Continued)

OTHER PUBLICATIONS

The First Office Action dated Feb. 2, 2019, from the State Intellectual Property Office of People's Republic of China in counterpart Chinese application No. 201610341431.3.
(Continued)

*Primary Examiner* — Michael H Caley
*Assistant Examiner* — Jonathan Y Jung
(74) *Attorney, Agent, or Firm* — Morgan, Lewis & Bockius LLP (57) ABSTRACT

A liquid crystal display device is provided. The liquid crystal display device includes a driving circuit; a lower insulation layer; an upper insulation layer; and an inorganic insulation layer. The driving circuit is disposed in a bezel area on a lower substrate. The lower insulation layer includes a lower opening through which an inorganic layer on the lower substrate is exposed and the lower opening is located at an outer side of the lower substrate than the driving circuit. The upper insulation layer is disposed on the lower insulation layer and includes an upper opening corresponding to the lower opening. The inorganic insulation layer is disposed on the upper insulation layer and in direct contact with the inorganic layer on the lower substrate so as to minimize damage to the driving circuit caused by infiltration of moisture from the outside.

14 Claims, 7 Drawing Sheets

(58) Field of Classification Search
CPC . G02F 1/1339; H01L 51/5237; H01L 51/524;
H05B 33/04
See application file for complete search history.

(56) References Cited

U.S. PATENT DOCUMENTS

| | | | |
|---|---|---|---|
| 2005/0285522 A1* | 12/2005 | Han | H05B 33/04 |
| | | | 313/512 |
| 2006/0192915 A1 | 8/2006 | Kimura | |
| 2007/0279565 A1 | 12/2007 | Iwato et al. | |
| 2010/0194707 A1* | 8/2010 | Hotelling | G02F 1/13338 |
| | | | 345/173 |
| 2013/0300953 A1 | 11/2013 | Hotelling et al. | |
| 2015/0029432 A1* | 1/2015 | Ishikawa | G02F 1/13394 |
| | | | 349/43 |
| 2015/0301370 A1* | 10/2015 | Moriwaki | G02F 1/1339 |
| | | | 349/42 |
| 2015/0372253 A1* | 12/2015 | Hong | H01L 51/5253 |
| | | | 257/40 |
| 2016/0116772 A1* | 4/2016 | Cha | G02F 1/1339 |
| | | | 349/123 |
| 2017/0123247 A1* | 5/2017 | Hirota | G02F 1/13394 |
| 2017/0176820 A1* | 6/2017 | Nomura | G02F 1/133512 |

FOREIGN PATENT DOCUMENTS

| | | |
|---|---|---|
| CN | 201611416 U | 10/2010 |
| CN | 102854664 A | 1/2013 |
| CN | 104603685 A | 5/2015 |

OTHER PUBLICATIONS

The Second Office Action dated Jun. 17, 2019, from the State Intellectual Property Office of People's Republic of China in counterpart Chinese application No. 201610341431.3.

* cited by examiner

LIQUID CRYSTAL DISPLAY DEVICE

CROSS-REFERENCE TO RELATED APPLICATIONS

This application claims the priority of Korean Patent Application No. 10-2015-0096419 filed on Jul. 7, 2015, in the Korean Intellectual Property Office, the disclosure of which is incorporated herein by reference.

BACKGROUND

Field

The present disclosure relates to a liquid crystal display device, and more particularly, to a liquid crystal display device with improved reliability by minimizing infiltration of moisture.

Description of the Related Art

A liquid crystal display (LCD) device is a display device for displaying an image by transmitting or shielding a light generated from a light source. In the LCD device, the light source is disposed under a liquid crystal and an electric field is applied to the liquid crystal to control alignment of the liquid crystal. The LCD device is applied to various electronic devices such as a smartphone, and a tablet PC, etc. Particularly, in recent years, studies for reducing a bezel area of the LCD device are being actively conducted to improve aesthetics of the LCD device and reduce a size of the LCD device.

The LCD device includes a display element disposed in an active area and configured to implement an image and a driving circuit disposed in a bezel area and configured to supply a driving voltage to the display element. The driving circuit may be formed into a chip separated from a lower substrate of the LCD device. Otherwise, the driving circuit may be formed directly on the lower substrate of the LCD device in order to reduce manufacturing costs of the LCD device and also reduce a volume and a weight of the LCD device. Further, the LCD device includes an insulation layer formed of an organic material in order to suppress infiltration of foreign materials into the display element and the driving circuit and flattens a top surface of the lower substrate. The insulation layer formed of an organic material is in contact with an inorganic layer on the lower substrate. However, the insulation layer formed of an organic material cannot be closely bonded to the inorganic layer on the lower substrate. Therefore, moisture may infiltrate through an interface between the insulation layer and the inorganic layer. Upon infiltration of moisture, circuit lines in the driving circuit may be eroded by the moisture. For example, if a voltage is applied to the circuit lines as being exposed to the moisture, the circuit lines may be eroded by an electric field and the moisture. Particularly, as the bezel area is reduced, the driving circuit is disposed at an outer periphery of the lower substrate. The moisture infiltrating through the interface between the insulation layer and the inorganic layer on the lower substrate can easily reach the driving circuit. Therefore, the erosion of the driving circuit may be accelerated, and, thus, the reliability of the LCD device may deteriorate.

Further, as the bezel area is reduced, an alignment layer and a sealant of the LCD device may be overlapped. The alignment layer is a member configured to uniformly maintain initial alignment of liquid crystals in the LCD device. The sealant is a member configured to seal the display element and the driving circuit within the LCD device. The alignment layer may be formed by coating an alignment material and then performing an alignment process. The sealant may be formed by coating a sealing material and then curing the sealing material. If the bezel area is small, a distance between the sealant and the alignment layer is decreased. Therefore, after the alignment material and the sealing material are coated, the alignment layer and the sealant may be overlapped while the alignment material and the sealing material are spread. The sealant is formed of an inorganic material which is not readily bonded to the alignment layer. Therefore, if the sealant and the alignment layer are overlapped, the adhesion of the sealant may be decreased, and, thus, a sealing function of the sealant may be reduced.

Meanwhile, a touch screen panel (TSP) may be added to the LCD device so as to enable a touch input. A TSP is a device configured to sense a user's touch input to a display device, and capacitive TSPs have been mainly used. A general TSP is manufactured as a separate panel and bonded onto a screen of an LCD device. In this case, the total thickness of the LCD device is increased and the visibility of the LCD device may be reduced due to the increased thickness.

In order to solve the above-described problem, recently, an in-cell touch LCD device with a TSP integrated into the LCD device has been developed. In the in-cell touch LCD device, a touch electrode configured to sense a user's touch input is disposed within a display element. A touch signal generated from the touch electrode is transferred through a touch line. The touch line is extended in a bezel area in a lower substrate of the LCD device and connected to a touch pad.

However, as the bezel area of the LCD device is reduced, an area for accommodating the touch line is also reduced. Particularly, in the in-cell touch LCD device, the touch line is disposed on the lower substrate of the LCD device. In addition to the touch line, other lines may be further disposed on the lower substrate of the LCD device, and a driving circuit configured to supply a driving voltage to a display element may be disposed. Therefore, an area for the touch line is further reduced. As the bezel area is reduced, a width of the touch line is necessarily reduced. If the width of the touch line is reduced, a resistance of the touch line is increased. Therefore, a touch signal may be delayed.

SUMMARY

Accordingly, the present disclosure is directed to a liquid crystal display device that substantially obviates one or more of the problems due to limitations and disadvantages of the related art.

Accordingly, an object of the present disclosure is to provide a liquid crystal display device wherein an inorganic insulation layer is disposed to be in direct contact with an inorganic layer of a lower substrate so as to minimize infiltration of moisture. Thus, a driving circuit has minimized damage caused by the moisture and the reliability of the liquid crystal display device is improved.

Another object of the present disclosure is to provide a liquid crystal display device wherein a contact area between a sealant and an inorganic insulation layer is maximized through an upper opening and a lower opening, and, thus, the sealant has improved adhesion and also has an excellent sealing quality.

Yet another object of the present disclosure is to provide a liquid crystal display device wherein an upper slit pattern is formed on an upper insulation layer so as to control spreading widths of an alignment layer and a sealant and, thus, suppress an overlap between the alignment layer and the sealant and minimize a decrease in adhesion of the sealant caused by the overlap between the alignment layer and the sealant.

Still another object of the present disclosure is to provide a liquid crystal display device wherein a second metal line disposed between an upper insulation layer and a lower insulation layer and a third metal line disposed on the upper insulation layer are connected to a first metal line disposed under the lower insulation layer so as to reduce a resistance of the first metal line. Thus, a touch line included in the liquid crystal display device may be disposed with a small width in a small bezel area.

Additional features and advantages of the disclosure will be set forth in the description which follows, and in part will be apparent from the description, or may be learned by practice of the disclosure. The objectives and other advantages of the disclosure will be realized and attained by the structure particularly pointed out in the written description and claims hereof as well as the appended drawings.

In another aspect, a liquid crystal display device comprises a driving circuit, a lower insulation layer, an upper insulation layer, and an inorganic insulation layer. The driving circuit is disposed in a bezel area on a lower substrate. The lower insulation layer includes a lower opening through which an inorganic layer on the lower substrate is exposed and is disposed at an outer side of the lower substrate than the driving circuit. The upper insulation layer is disposed on the lower insulation layer and includes an upper opening corresponding to the lower opening. The inorganic insulation layer is disposed on the upper insulation layer and in direct contact with the inorganic layer on the lower substrate so as to minimize damage to the driving circuit caused by infiltration of moisture from the outside.

In another aspect, a liquid crystal display device comprises a lower substrate, a lower insulation layer, an upper insulation layer, an inorganic insulation layer, a touch electrode, a first metal line, a second metal line, a third metal line and a driving circuit. The lower substrate includes an active area and a bezel area. The lower insulation layer includes a lower opening through which an inorganic layer on the lower substrate is exposed and is disposed in the bezel area. The upper insulation layer is disposed on the lower insulation layer and includes an upper opening corresponding to the lower opening. The inorganic insulation layer is disposed on the upper insulation layer and in direct contact with the inorganic layer on the lower substrate and exposed through the upper opening and the lower opening. The touch electrode is disposed in the active area on the lower substrate. The first metal line is disposed between the inorganic insulation layer and the upper insulation layer in the bezel area and electrically connected to the touch electrode. The second metal line is disposed between the upper insulation layer and the lower insulation layer in the bezel area and connected to the first metal line. The third metal line is disposed between the lower insulation layer and the lower substrate in the bezel area and connected to the second metal line. The driving circuit is located at an outer side than the first metal line but is located at an inner side than the lower opening in the bezel area.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE ILLUSTRATED EMBODIMENTS

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Throughout the whole specification, the same reference numerals denote the same elements.

Since size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated in technically various ways, and the embodiments can be carried out independently of or in association with each other.

Hereinafter, various exemplary embodiments of the present disclosure will be described in detail with reference to the accompanying drawings.

Figure 1:
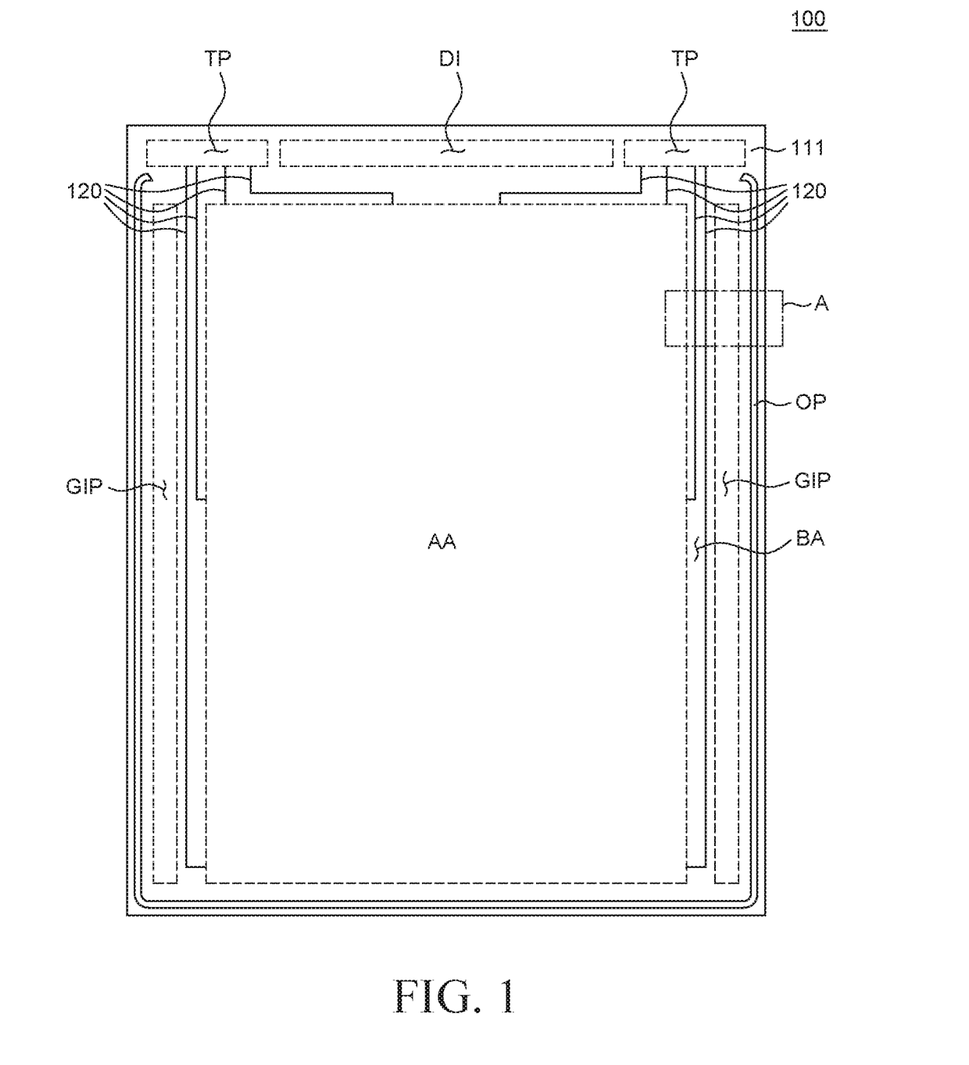
FIG. 1 is a schematic plane view provided to explain a liquid crystal display device according to an exemplary embodiment of the present disclosure.
Figure 2A:
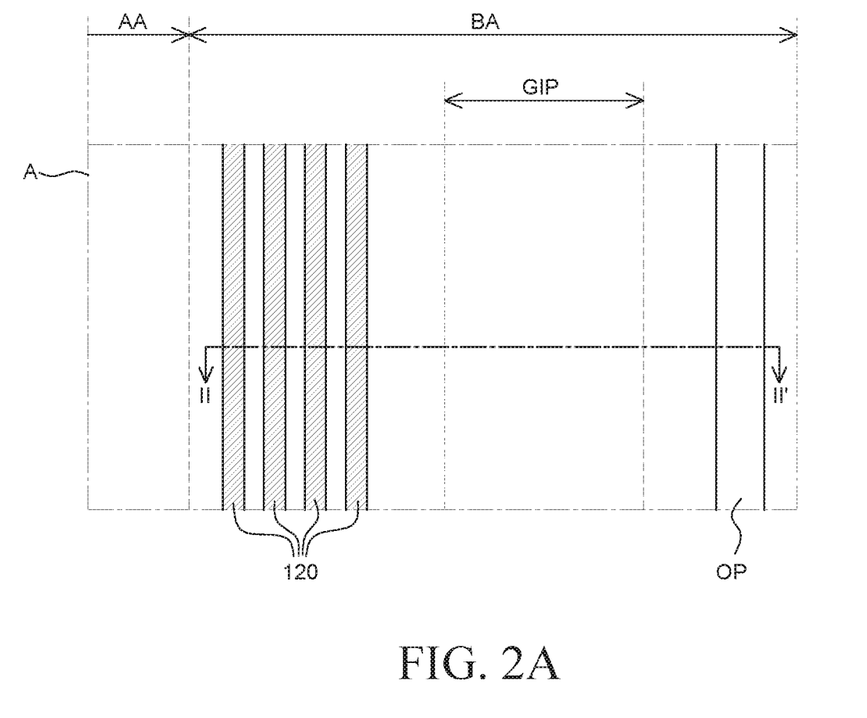
FIG. 2A is a partially enlarged plane view of a section A of FIG. 1.
Figure 2B:
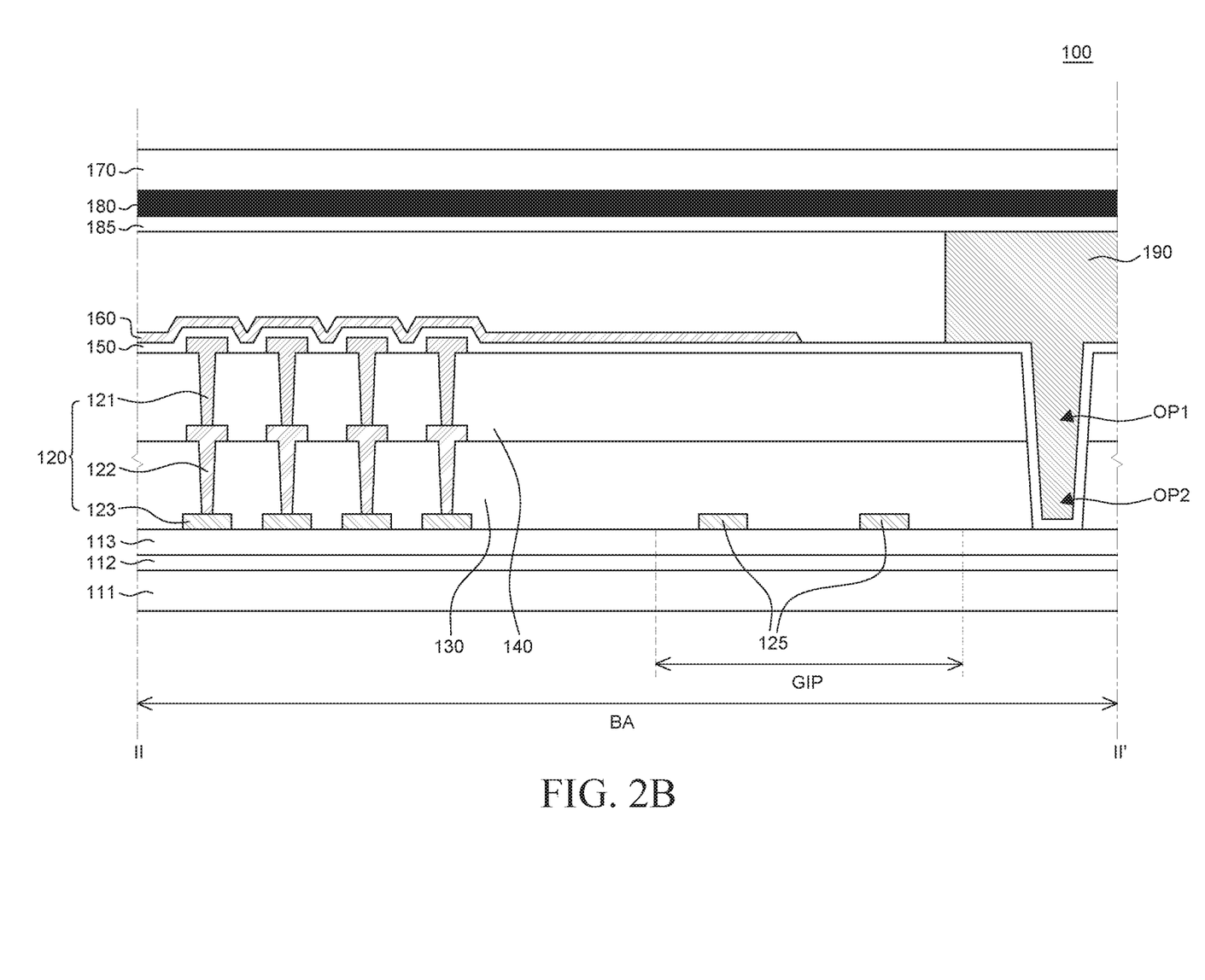
FIG. 2B is a schematic cross-sectional view taken along a line II-II' of FIG. 2A.

FIG. 1 is a schematic plane view provided to explain a liquid crystal display device according to an exemplary embodiment of the present disclosure. FIG. 2A is a partially enlarged plane view of a section A of FIG. 1. FIG. 2B is a schematic cross-sectional view taken along a line II-II' of FIG. 2A. Referring to FIG. 1 through FIG. 2B, a liquid crystal display (LCD) device 100 includes a lower substrate 111, a driving circuit, a metal line 120, a lower insulation layer 130, an upper insulation layer 140, an inorganic insulation layer 150, an alignment layer 160, a sealant 190, and an upper substrate 170. For convenience in explanation, FIG. 1 and FIG. 2A do not illustrate the upper substrate 170 and a sealant 190.

Referring to FIG. 1 through FIG. 2B, the lower substrate 111 is configured to support or accommodate various components of the LCD device 100 and may be a glass substrate or a plastic substrate. The lower substrate 111 includes an active area AA and a bezel area BA. The active area AA refers to an area where an image is displayed on the LCD device 100. The bezel area BA refers to the area other than the active area AA.

In the active area AA, display elements are disposed. The display elements may include various elements constituting a pixel of the LCD device 100. For example, the display elements may include a thin film transistor (TFT), a pixel electrode connected to the TFT, a common electrode separated from the pixel electrode, and the alignment layer 160 and a liquid crystal disposed on the pixel electrode.

Further, in the active area AA, a touch electrode configured to sense a user's touch input is disposed. The touch electrode may include a sensing electrode and a driving electrode intersecting with each other. The sensing electrode and the driving electrode have different potentials. If an object charged with electrostatic charges, such as a user's finger or a stylus, approaches the touch electrode, a potential difference between the sensing electrode and the driving electrode may be changed. Then, a user's touch input may be sensed on the basis of a touch signal generated due to the change in potential difference. The touch electrode may be disposed within the display element in an in-cell type. For example, the touch electrode may be implemented as a common electrode of the display element. In this case, the common electrode functions as a touch electrode and also functions as a common electrode. For example, during a touch sensing time for sensing a touch input, a driving voltage may be applied to the common electrode, and during a displaying time for displaying an image, a common voltage may be applied to the common electrode. In the following, the common electrode and the touch electrode will be described as the same component.

In the bezel area BA, the touch line 120, an opening OP, a driving circuit, a driving chip, and a touch pad TP are disposed. The touch pad TP is disposed at an upper end of the bezel area BA and configured to receive a touch signal from the touch line 120. FIG. 1 through FIG. 2B do not illustrate a detailed configuration of the touch pad TP and illustrate an area for the touch pad TP as dotted lines. The touch pad TP is connected to a touch printed circuit board. The touch signal received through the touch line 120 is transferred to the touch printed circuit board via the touch pad TP. The touch pads TP are disposed at a left upper end and a right upper end of the lower substrate 111 as being separated from each other, but are not limited thereto. The touch pad TP may be disposed only at one upper end of the lower substrate 111.

The driving chip is bonded onto the lower substrate 111 in a Chip On Glass (COG) type, and configured to supply a first driving voltage to the display element. For example, the driving chip may be a data driving chip DI configured to supply a data voltage to the display element or a gate driving chip configured to supply a gate voltage to the display element. In the following, the driving chip will be described as the data driving chip DI. The data driving chip DI is disposed between the touch pads TP. Further, the data driving chip DI may be electrically connected to a data line, and a data voltage generated by the data driving chip DI may be transferred to the display element through the data line.

The driving circuit is formed directly on the lower substrate 111 and configured to supply a second driving voltage to the display element. For example, the driving circuit may be a gate driving circuit configured to supply a gate voltage to the display element or a data driving circuit configured to supply a data voltage to the display element. In the following, the driving circuit will be described as the gate driving circuit. The gate driving circuit is formed directly on the lower substrate 111. Therefore, it may be referred to as a Gate-In-Panel (GIP). If the gate driving circuit GIP is formed directly on the lower substrate 111, it is possible to reduce manufacturing costs of the LCD device and also possible to reduce a weight and a volume of the LCD device. For convenience in explanation, FIG. 1 does not illustrate a detailed configuration of the gate driving circuit GIP and illustrates an area for the gate driving circuit GIP by a dotted line.

The touch line 120 is connected to the touch electrode (i.e. the common electrode) disposed in the active area AA, and configured to receive a touch signal from the touch electrode and transfer the touch signal to the touch pad TP. The touch line 120 is extended in the bezel area BA so as to be connected to the touch pad TP. Referring to FIG. 2A, the touch line 120 is extended inside the gate driving circuit GIP, but is not limited thereto. The touch line 120 may be extended outside the gate driving circuit GIP, or may be extended inside and outside the gate driving circuit GIP.

The opening OP is disposed outside the gate driving circuit GIP and extended along a lateral surface of the gate driving circuit GIP. As illustrated in FIG. 1, the opening OP is extended along an edge of the bezel area BA so as to surround the lateral surface of the gate driving circuit GIP. For example, the opening OP is extended along the edge of the bezel area BA of the lower substrate 111 so as to be spaced from an area where the touch line 120 is extended. As illustrated in FIG. 2A, the opening OP may have a uniform width. For example, the opening OP may be formed to a width of from 10 μm to 30 μm.

The opening OP is disposed outside the gate driving circuit GIP and configured to minimize damage to the gate driving circuit GIP caused by moisture. Details thereof will be described with reference to FIG. 2B.

Referring to FIG. 2B, the opening OP is divided into an upper opening OP1 and a lower opening OP2. The upper opening OP1 is formed in the upper insulation layer 140 and the lower opening OP2 is formed in the lower insulation layer 130. A top surface of an interlayer insulation layer 113 on the lower substrate 111 is exposed through the upper opening OP1 and the lower opening OP2. As described above, the TFT is disposed in the active area AA of the lower substrate 111. Thus, a gate insulation layer 112 and the interlayer insulation layer 113 may be formed to cover the lower substrate 111. The top surface of the interlayer insulation layer 113 is exposed through the upper opening OP1 and the lower opening OP2. The gate insulation layer 112 and the interlayer insulation layer 113 may be inorganic layers formed of inorganic materials such as silicon oxide (SiOx) and silicon nitride (SiNx). Therefore, the inorganic layer on the lower substrate 111 is exposed through the upper opening OP1 and the lower opening OP2.

The lower insulation layer 130 is configured to cover the interlayer insulation layer 113. On the lower substrate 111 in the active area AA, a plurality of TFTs and lines are formed. Thus, a step may be formed at an upper part of the lower substrate 111. The lower insulation layer 130 is configured to cover the step formed at the upper part of the lower substrate 111 and flatten the upper part of the lower substrate 111. The lower insulation layer 130 is formed of an organic material so as to compensate the step at the upper part of the lower substrate 111 and flatten a top surface of the lower substrate 111. For example, the lower insulation layer 130 may be formed of photo acryl (PAC). In this case, the lower insulation layer 130 may be formed to a thickness of from 2 μm to 3 μm so as to sufficiently cover the step formed at the upper part of the lower substrate 111.

The upper insulation layer 140 is disposed so as to cover the lower insulation layer 130. The upper insulation layer 140 is formed of an organic material. For example, the upper insulation layer 140 may be formed of the same organic material as the lower insulation layer 130, and may be formed to a thickness of from 2 μm to 3 μm.

A first metal line 121 is disposed on the upper insulation layer 140, and a second metal line 122 connected to the first metal line 121 is disposed between the upper insulation layer 140 and the lower insulation layer 130. A third metal line 123 connected to the second metal line 122 is disposed between the lower insulation layer 130 and the interlayer insulation layer 113. The first metal line 121 may be electrically connected to the touch electrode. For example, the first metal line 121 may be connected to a common electrode line connected to the common electrode in the active area AA, and the first metal line 121 may be electrically connected to the common electrode through the common electrode line. As described above, the common electrode functions as a touch electrode. Therefore, a touch signal from the common electrode may be transferred to the first metal line 121 through the common electrode line.

The first metal line 121, the second metal line 122, and the third metal line 123 constitute the touch line 120 as being connected to each other. Since the touch line 120 includes the first metal line 121, the second metal line 122, and the third metal line 123, a resistance of the touch line 120 may be reduced and a width of the touch line 120 may be reduced. Further, a size of the bezel area BA may be reduced. Specifically, the touch electrodes are densely disposed within the active area AA so as to sense a user's detailed touch input. As the touch electrodes are more densely disposed, a more detailed touch input can be sensed. Therefore, in order to improve a function of sensing a touch input, the number of touch electrodes disposed in a unit area may be increased. Meanwhile, as illustrated in FIG. 1, a touch signal generated from the touch electrode is transferred to the touch pad TP through the touch line 120. Therefore, as the number of touch electrodes is increased, the number of touch lines 120 needs to be increased. However, a size of the bezel area BA is limited and the demand for the LCD device 100 including a thinner bezel has been increased in recent years. Therefore, a space for the touch line 120 is necessarily limited. Accordingly, the touch line 120 is formed to a very small width. However, if the touch line 120 has a small width, a resistance of the touch line 120 is increased. Therefore, there may be delay in transfer of a touch signal.

In the LCD device 100 according to an exemplary embodiment of the present disclosure, as illustrated in FIG. 2B, the first metal line 121, the second metal line 122, and the third metal line 123 constitute the touch line 120 as being connected to each other on different planes. Therefore, even if the touch line 120 has a small width, a resistance of the touch line 120 may be maintained at a sufficiently low level. That is, the touch line 120 of the LCD device 100 according to an exemplary embodiment of the present disclosure has a small width and a low resistance. Therefore, it is possible to rapidly transfer a touch signal and also possible to reduce a size of a bezel.

The upper insulation layer 140 is disposed between the first metal line 121 and the second metal line 122 and the lower insulation layer 130 is disposed between the second metal line 122 and the third metal line 123 such that the first metal line 121, the second metal line 122, and the third metal line 123 are respectively disposed on different planes. The upper insulation layer 140 and the lower insulation layer 130 include a plurality of contact holes. The first metal line 121, the second metal line 122, and the third metal line 123 may be connected to each other through the contact holes.

The inorganic insulation layer 150 is disposed on the upper insulation layer 140 so as to cover the first metal line 121. The inorganic insulation layer 150 is in contact with the top surface of the interlayer insulation layer 113 exposed through the upper opening OP1 and the lower opening OP2. The inorganic insulation layer 150 may be formed of silicon oxide or silicon nitride in the same manner as the interlayer insulation layer 113.

The alignment layer 160 is disposed on the inorganic insulation layer 150 and configured to uniformly maintain initial alignment of liquid crystals. The alignment layer 160 is formed by coating an alignment material on the inorganic insulation layer 150 and irradiating ultraviolet (UV) rays thereto. The alignment material may react with the UV rays and thus have an alignment force. However, a method for forming the alignment layer 160 is not limited thereto. The alignment layer 160 may be formed by a rubbing method.

The upper substrate 170 is disposed on the alignment layer 160. The upper substrate 170 is disposed to face the lower substrate 111 and configured to protect the touch line 120, the gate driving circuit GIP, and the display elements in the active area AA from an external environment. The upper substrate 170 may be formed of glass or plastic having an excellent light transmissivity.

A black matrix 180 is disposed under the upper substrate 170. The black matrix 180 may be formed of a material having an excellent light absorbance. Further, the black matrix 180 covers the bezel area BA in order to suppress the touch line 120 and the gate driving circuit GIP disposed in the bezel area BA from being visible to the user.

Although not illustrated in FIG. 2B, a color filter layer may be disposed between the upper substrate 170 and the black matrix 180 or on the same plane as the black matrix 180. The color filter layer can be disposed corresponding to the active area AA and implements a color by selectively transmitting light penetrating a liquid crystal.

Further, an overcoating layer 185 is disposed under the black matrix 180 and the color filter layer. The overcoating layer 185 is configured to compensate a step (or unevenness) formed at a lower part of the upper substrate 170 by the color filter layer and the black matrix 180 and minimize introduction of impurities into the black matrix 180 and the color filter layer.

The sealant 190 is disposed between the upper substrate 170 and the lower substrate 111 in order for the upper substrate 170 and the lower substrate 111 to seal each other. The sealant 190 seals components disposed between the upper substrate 170 and the lower substrate 111 from an external environment. Therefore, the sealant 190 is disposed at an outermost area of the lower substrate 111 and covers the upper opening OP1 and the lower opening OP2. The sealant 190 is disposed as being separated from the alignment layer 160. If the alignment layer 160 is in contact with the sealant 190, the adhesion at an interface between the alignment layer 160 and the sealant 190 is weaker than the adhesion at the other parts. Therefore, a sealing function of the sealant 190 may be reduced. That is, since the sealant 190 is formed of an inorganic material which is not readily bonded to the alignment layer 160, the adhesion of the sealant 190 at the interface between the sealant 190 and the alignment layer 160 may be reduced. Therefore, as illustrated in FIG. 2B, the alignment layer 160 and the sealant 190 are spaced from each other and not overlapped with each other.

The gate driving circuit GIP may include various circuits that generate gate voltages. For example, the gate driving circuit GIP may include a shift register, a level shifter, and the like and also include a circuit line 125 connecting the circuits. The circuit line 125 of the gate driving circuit GIP may be formed of metal such as aluminum and copper. The circuit line 125 of the gate driving circuit GIP may be eroded by moisture. For example, if a voltage is applied to the circuit line 125 while the circuit line 125 formed of aluminum is exposed to moisture, the moisture and an electric field may cause erosion of aluminum and thus damage the circuit line 125. In this case, the reliability of the gate driving circuit GIP may deteriorate.

The gate driving circuit GIP is disposed closer to the inner side than the upper opening OP1 and the lower opening OP2 in order to minimize erosion of the circuit line 125 of the gate driving circuit GIP caused by moisture. The upper opening OP1 and the lower opening OP2 suppress infiltration of moisture and thus minimize erosion of the circuit line 125.

As described above, the top surface of the interlayer insulation layer 113 on the lower substrate 111 is partially exposed through the upper opening OP1 and the lower opening OP2. Further, the inorganic insulation layer 150 is in direct contact with the interlayer insulation layer 113 through the upper opening OP1 and the lower opening OP2. Both the inorganic insulation layer 150 and the interlayer insulation layer 113 are formed of inorganic materials such as silicon oxide or silicon nitride. Thus, an interface where the inorganic insulation layer 150 and the interlayer insulation layer 113 are in contact with each other is an interlayer between inorganic layers. Meanwhile, the lower insulation layer 130 needs to flatten (or planarize) the upper part of the lower substrate 111 and thus is formed of an organic material capable of compensating a step (or unevenness). Therefore, an interface where the lower insulation layer 130 and the interlayer insulation layer 113 are in contact with each other is an interface between an organic layer and an inorganic layer. Generally, an organic layer has a higher moisture infiltration rate than an inorganic layer. Particularly, the organic layer and the inorganic layer cannot be closely bonded to each other at an interface where the organic layer is in contact with the inorganic layer. Thus, moisture can easily infiltrate through the interface. Therefore, moisture may infiltrate through the interface where the lower insulation layer 130 is in contact with the interlayer insulation layer 113. Particularly, while the LCD device 100 is cut into cell units, cracks may form at the interface between the lower insulation layer 130 and the interlayer insulation layer 113 and moisture may more easily infiltrate through such cracks. However, the inorganic insulation layer 150 is in direct contact with the interlayer insulation layer 113 through the upper opening OP1 and the lower opening OP2. Therefore, even if moisture is introduced through the interface between the lower insulation layer 130 and the interlayer insulation layer 113, infiltration of the moisture may be suppressed at an interface between the inorganic insulation layer 150 and the interlayer insulation layer 113. Accordingly, it is possible to minimize exposure of the circuit lines 125 to moisture and also possible to reduce the possibility of erosion of the circuit lines 125. Meanwhile, as illustrated in FIG. 1, the opening OP is extended along the edge of the bezel area BA except the area where the touch line 120 is extended so as to surround the lateral surface of the gate driving circuit GIP. Therefore, it is possible to effectively suppress infiltration of moisture into the gate driving circuit GIP.

Further, since the sealant 190 covers the upper opening OP1 and the lower opening OP2, a contact area between the sealant 190 and the inorganic insulation layer 150 may be increased and the adhesion between the sealant 190 and the inorganic insulation layer 150 may be increased. Thus, the sealant 190 may firmly and closely seal the upper substrate 170 and the lower substrate 111. Further, the circuit line 125 may be protected from moisture by the inorganic insulation layer 150 and the sealant 190.

The upper opening OP1 and the lower opening OP2 may be formed by different patterning processes. For example, the lower insulation layer 130 may be formed so as to cover the third metal line 123, and contact holes through which the third metal line 123 is partially exposed may be formed. During this process, the lower opening OP2 may be formed together with the contact holes. Then, the second metal line 122 connected to the third metal line 123 is formed, and the upper insulation layer 140 is formed so as to cover the second metal line 122. Then, contact holes through which the second metal line 122 is partially exposed may be formed. The upper opening OP1 may be formed together with the contact holes during the formation of the contact holes through which the second metal line 122 is exposed. In this case, a step may be formed between a lateral surface of the upper opening OP1 and a lateral surface of the lower opening OP2 due to an alignment error between a mask for forming the lower opening OP2 and a mask for forming the upper opening OP1. However, a width of the upper opening OP1 may be determined considering a taper angle and a depth of the lower opening OP2. Further, the step between the lateral surface of the upper opening OP1 and the lateral surface of the lower opening OP2 may be minimized as illustrated in FIG. 2B by minimizing an alignment error between the lower opening OP2 and the upper opening OP1.

The LCD device 100 according to an exemplary embodiment of the present disclosure includes the touch line 120 including the first metal line 121, the second metal line 122, and the third metal line 123. Thus, it is possible to sufficiently maintain a resistance of the touch line 120 while minimizing a width of the touch line 120. Accordingly, it is possible to minimize a size of the bezel area BA. Further, it is possible to rapidly sense a touch while maintaining a small thickness of a bezel of the LCD device 100. The LCD device 100 according to an exemplary embodiment of the present disclosure further includes the upper opening OP1 and the lower opening OP2 disposed outside the gate driving circuit GIP. Further, the inorganic insulation layer 150 is in direct contact with the inorganic layer (i.e., the interlayer insulation layer 113) on the lower substrate 111 through the upper opening OP1 and the lower opening OP2. Thus, it is possible to minimize infiltration of moisture and thus possible to minimize erosion of the circuit line 125 of the gate driving circuit GIP caused by moisture. Further, a contact area between the sealant 190 and the inorganic insulation layer 150 is increased due to the upper opening OP1 and the lower opening OP2. Therefore, it is possible to firmly and closely seal the upper substrate 170 and the lower substrate 111. Accordingly, the reliability of the LCD device 100 can be improved.

Figure 3A:
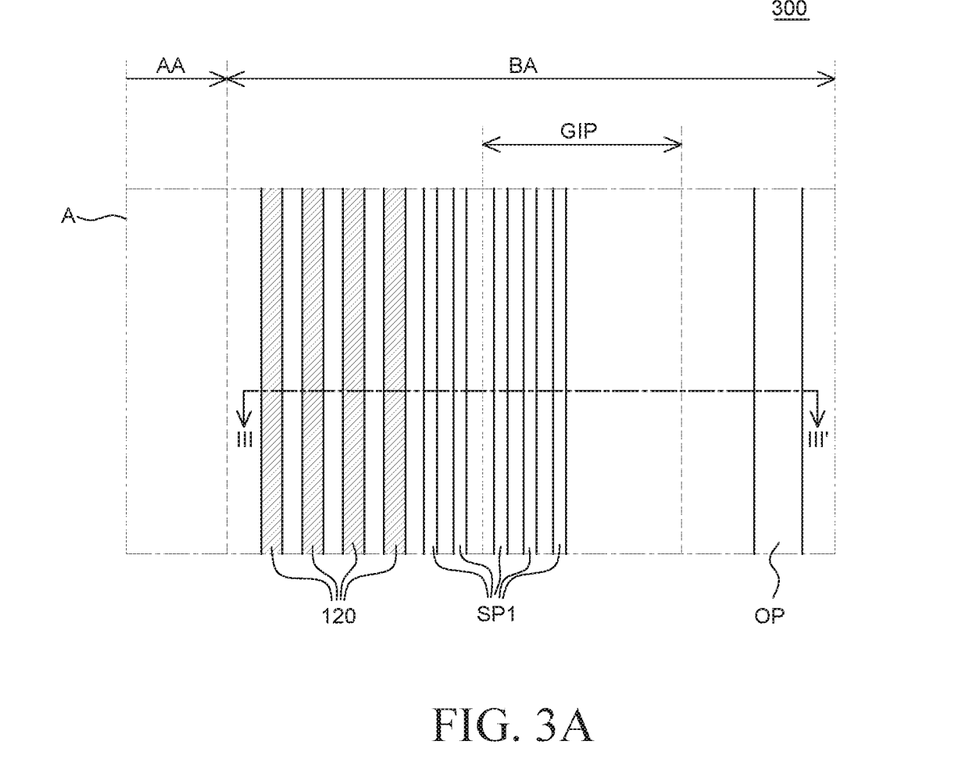
FIG. 3A is a plane view provided to explain a liquid crystal display device according to another exemplary embodiment of the present disclosure.
Figure 3B:
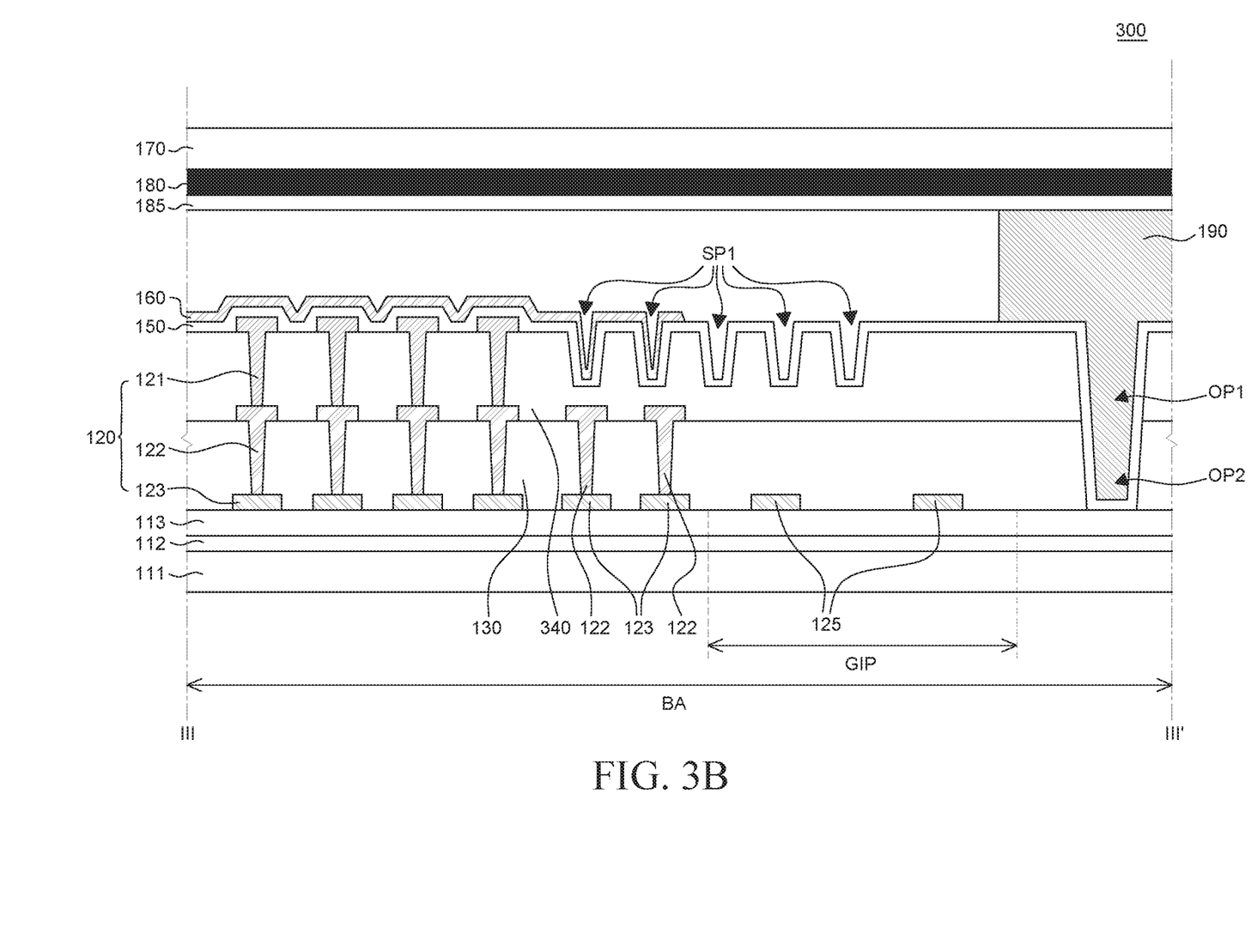
FIG. 3B is a schematic cross-sectional view taken along a line III-III' of FIG. 3A.

FIG. 3A is a plane view provided to explain an LCD device according to another exemplary embodiment of the present disclosure. FIG. 3B is a schematic cross-sectional view taken along a line III-III' of FIG. 3A. Herein, FIG. 3A is a partially enlarged plane view of the section A of FIG. 1. An LCD device according to another exemplary embodiment of the present disclosure is substantially the same as the LCD device 100 according to an exemplary embodiment of the present disclosure as illustrated in FIG. 1 through FIG. 2B except that upper slit patterns SP1 disposed closer to the inner side than the opening OP are further included. Therefore, the redundant description thereof will be omitted.

Referring to FIG. 3A and FIG. 3B, the upper slit patterns SP1 are disposed closer to the inner side than the opening OP. For example, the upper slit patterns SP1 are disposed between the touch line 120 and the opening OP. The upper slit patterns SP1 are extended in the same direction as the opening OP and disposed as being spaced at a uniform distance from each other, but are not limited thereto. The upper slit patterns SP1 may be extended in different direction from the opening OP.

As illustrated in FIG. 3B, the upper slit patterns SP1 are formed in an upper insulation layer 340. That is, the upper opening OP1 corresponding to the lower opening OP2 and the upper slit patterns SP1 are formed in the upper insulation layer 340. As illustrated in FIG. 3B, a depth of the upper slit pattern SP1 may be smaller than a depth of the upper opening OP1. Otherwise, the depth of the upper slit pattern SP1 may be the same as the depth of the upper opening OP1. That is, the depth of the upper slit pattern SP1 is not particularly limited. If the depth of the upper slit pattern SP1 is smaller than the depth of the upper opening OP1, only a lateral surface of the upper insulation layer 340 may be exposed through the upper slit patterns SP1. However, a top surface of the lower insulation layer 130 may not be exposed. In this case, the inorganic insulation layer 150 covers the exposed lateral surface of the upper insulation layer 340. If the depth of the upper slit pattern SP1 is the same as the depth of the upper opening OP1, the lateral surface of the upper insulation layer 340 and the top surface of the lower insulation layer 130 may be exposed through the upper slit patterns SP1. In this case, the inorganic insulation layer 150 covers the exposed lateral surface of the upper insulation layer 340 and the exposed top surface of the lower insulation layer 130. A width of the upper slit pattern SP1 may be smaller than 10 μm. For example, the upper slit pattern SP1 may be formed to a width in the range of from 3.5 μm to 10 μm.

The upper slit patterns SP1 are overlapped with the area for the gate driving circuit GIP. Therefore, the circuit line 125 of the gate driving circuit GIP is disposed under the upper slit patterns SP1. Further, the upper slit patterns SP1 are overlapped with at least one of the third metal line 123 and the second metal line 122. FIG. 3B illustrates a case where both the third metal line 123 and the second metal line 122 are overlapped with the upper slit patterns SP1. The first metal line 121 is not overlapped with the upper slit patterns SP1. That is, since the third metal line 123 and the second metal line 122 are disposed on the planes different from the upper insulation layer 340, at least one of the third metal line 123 and the second metal line 122 may be disposed under the upper slit patterns SP1. However, since the first metal line 121 is disposed on the upper insulation layer 340, it is not overlapped with the upper slit patterns SP1.

The upper slit patterns SP1 may be formed together with the upper opening OP1 while the upper opening OP1 is formed. For example, the upper insulation layer 340 is formed so as to cover the second metal line 122 and then contact holes through which the second metal line 122 is partially exposed are formed in the upper insulation layer 340. The upper slit patterns SP1 and the upper opening OP1 may be formed together during the formation of the contact holes through which the second metal line 122 is partially exposed. Specifically, the upper insulation layer 340 may be exposed using a half-tone mask through which an area corresponding to the contact holes and an area corresponding to the upper opening OP1 are wholly exposed and an area corresponding to the upper slit patterns SP1 is dimly exposed. Then, the upper insulation layer 340 may be etched so as to form contact holes through which the upper opening OP1 corresponding to the lower opening OP2 and the second metal line 122 are exposed. Further, the upper slit patterns SP1 having a smaller depth than the upper opening OP1 may be formed. Meanwhile, as described above, if the depth of the upper slit pattern SP1 is the same as the depth of the upper opening OP1, the upper slit patterns SP1, the upper opening OP1, and the contact holes through which the second metal line 122 is exposed may be formed using a full-tone mask through which the respective areas are wholly exposed.

The upper slit pattern SP1 minimizes an overlap between the alignment layer 160 and the sealant 190. As described above, the alignment layer 160 may be formed by coating an alignment material on the inorganic insulation layer 150 and irradiating UV rays thereto. Further, the sealant 190 may be formed by coating a sealing material on the inorganic insulation layer 150 and then curing the sealing material. If the alignment material and the sealing material are coated, the alignment material and the sealing material are spread on the inorganic insulation layer 150. If the bezel area BA has a sufficiently large size, the alignment layer 160 and the sealant 190 may not be overlapped with each other even when the alignment material and the sealing material are spread. However, if the bezel area BA has a small size, the alignment material and the sealing material are spread and the sealant 190 and the alignment layer 160 may be overlapped with each other. If the alignment layer 160 is overlapped with the sealant 190, the adhesion of the sealant 190 at the overlapped area is reduced, and, thus, the sealing function of the sealant 190 may be reduced accordingly. Therefore, the bezel area BA is small, it is necessary to control the spreading widths of the alignment layer 160 and the sealant 190. The spreading widths of the alignment layer 160 and the sealant 190 may be controlled using the upper slit patterns SP1 and the inorganic insulation layer 150. That is, grooves are formed in a top surface of the inorganic insulation layer 150 by the upper slit patterns SP1 and the top surface of the inorganic insulation layer 150 covering the alignment layer 160 is increased in area. Therefore, even when the alignment material is spread, the spreading widths of the alignment layer 160 and the sealant 190 may be reduced to cover the grooves in the inorganic insulation layer 150. Further, an overlap between the alignment layer 160 and the sealant 190 may be minimized.

As a result, the LCD device 300 according to another exemplary embodiment of the present disclosure includes the inorganic insulation layer 150 in direct contact with the interlayer insulation layer 113 through the upper opening OP1 and the lower opening OP2. Therefore, it is possible to minimize infiltration of moisture and thus possible to minimize damage to the circuit line 125 of the gate driving circuit GIP caused by the moisture. Further, the LCD device 300 according to another exemplary embodiment of the present disclosure may control the spreading widths of the alignment layer 160 and the sealant 190 through the upper slit patterns SP1. Therefore, it is possible to minimize an overlap between the alignment layer 160 and the sealant 190. Accordingly, the sealing function of the sealant 190 may be improved and a size of the bezel area BA may be reduced. Meanwhile, at least one of the third metal line 123 and the second metal line 122 may be overlapped with the upper slit patterns SP1. Therefore, even if the size of the bezel area BA is reduced, a resistance of the touch line 120 may be maintained at a predetermined level. Further, since a delay of a touch signal may be suppressed, touch performance may be improved.

Figure 4:
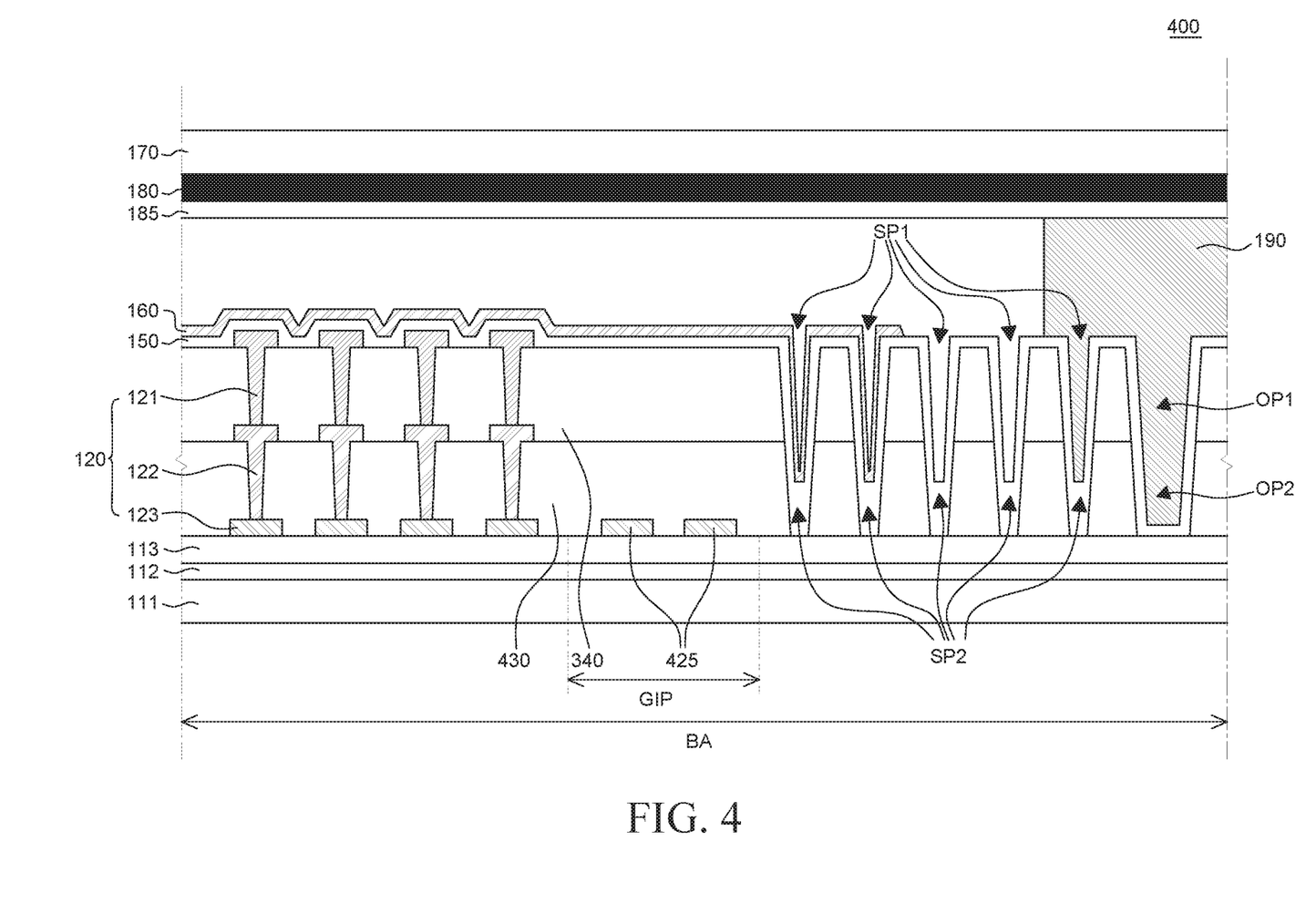
FIG. 4 is a schematic cross-sectional view provided to explain a liquid crystal display device according to yet another exemplary embodiment of the present disclosure.

FIG. 4 is a schematic cross-sectional view provided to explain an LCD device according to yet another exemplary embodiment of the present disclosure. An LCD device 400 according to yet another exemplary embodiment of the present disclosure is substantially the same as the LCD device 300 according to another exemplary embodiment of the present disclosure as illustrated in FIG. 3A and FIG. 3B except that lower slit patterns SP2 corresponding to the upper slit patterns SP1 are further included. Therefore, the redundant description thereof will be omitted.

Referring to FIG. 4, the lower slit patterns SP2 are formed in a lower insulation layer 430 so as to correspond to the upper slit patterns SP1. That is, the lower opening OP2 and the lower slit patterns SP2 are formed in the lower insulation layer 430. The lateral surface of the upper insulation layer 340 and a lateral surface of the lower insulation layer 430 are exposed through the upper slit patterns SP1 and the lower slit patterns SP2. The inorganic insulation layer 150 covers the exposed lateral surface of the upper insulation layer 340 and the exposed lateral surface of the lower insulation layer 430. As illustrated in FIG. 4, the interlayer insulation layer 113 on the lower substrate 111 is exposed through the lower slit patterns SP2. The inorganic insulation layer 150 is in direct contact with the interlayer insulation layer 113 through the upper slit patterns SP1 and the lower slit patterns SP2. A width of the lower slit pattern SP2 may be smaller than 10 μm. For example, the lower slit pattern SP2 may be formed to a width in the range of from 3.5 μm to 10 μm.

A micro step (or other type of uneven portion) may be formed between a lateral surface of the upper slit pattern SP1 and a lateral surface of the lower slit pattern SP2. That is, a step (or unevenness) may exist between the lateral surface of the upper slit pattern SP1 and the lateral surface of the lower slit pattern SP2 due to an alignment error between a mask for forming the upper slit pattern SP1 and a mask for forming the lower slit pattern SP2. However, a width of the upper slit pattern SP1 may be determined considering a taper angle and a depth of the lower slit pattern SP2. Further, the step between the lateral surface of the upper slit pattern SP1 and the lateral surface of the lower slit pattern SP2 may be minimized as illustrated in FIG. 4 by minimizing an alignment error between the lower slit pattern SP2 and the upper slit pattern SP1.

The gate driving circuit GIP is disposed to be closer to the inner side than the upper slit pattern SP1 and the lower slit pattern SP2. That is, the circuit line 425 of the gate driving circuit GIP is disposed closer to the inner side than the upper slit pattern SP1 and the lower slit pattern SP2. The upper slit pattern SP1 and the lower slit pattern SP2 control the spreading widths of the alignment layer 160 and the sealant 190 and protect the gate driving circuit GIP from moisture. Specifically, grooves are formed in the inorganic insulation layer 150 by the upper slit patterns SP1 and the lower slit patterns SP2. Further, the alignment material and the sealing material are spread while covering the grooves in the inorganic insulation layer 150. Therefore, the spreading widths of the alignment layer 160 and the sealant 190 may be reduced and an overlap between the alignment layer 160 and the sealant 190 may be minimized. Further, the interlayer insulation layer 113 is exposed through the upper slit patterns SP1 and the lower slit patterns SP2. Furthermore, the inorganic insulation layer 150 is in direct contact with the interlayer insulation layer 113 through the upper slit patterns SP1 and the lower slit patterns SP2. An interface where the interlayer insulation layer 113 is in contact with the inorganic insulation layer 150 is an interface between inorganic layers. Therefore, the interlayer insulation layer 113 and the inorganic insulation layer 150 may be closely bonded to each other and infiltration of moisture may be more effectively suppressed. That is, the infiltration of moisture is suppressed firstly at the interface between the interlayer insulation layer 113 and the inorganic insulation layer 150 closely bonded to each other through the upper opening OP1 and the lower opening OP2. Then, the infiltration of moisture is suppressed secondly at the interface between the interlayer insulation layer 113 and the inorganic insulation layer 150 closely bonded to each other through the upper slit patterns SP1 and the lower slit patterns SP2. Accordingly, the gate driving circuit GIP can be more safely protected from moisture.

In the LCD device 400 according to yet another exemplary embodiment of the present disclosure, the inorganic insulation layer 150 is in direct contact with the interlayer insulation layer 113 at an area for the upper slit patterns SP1 and the lower slit patterns SP2 and an area for the upper opening OP1 and the lower opening OP2. Thus, it is possible to effectively suppress infiltration of moisture and also possible to minimize erosion of the gate driving circuit GIP. Therefore, the reliability of the LCD device 400 may be improved.

Figure 5:
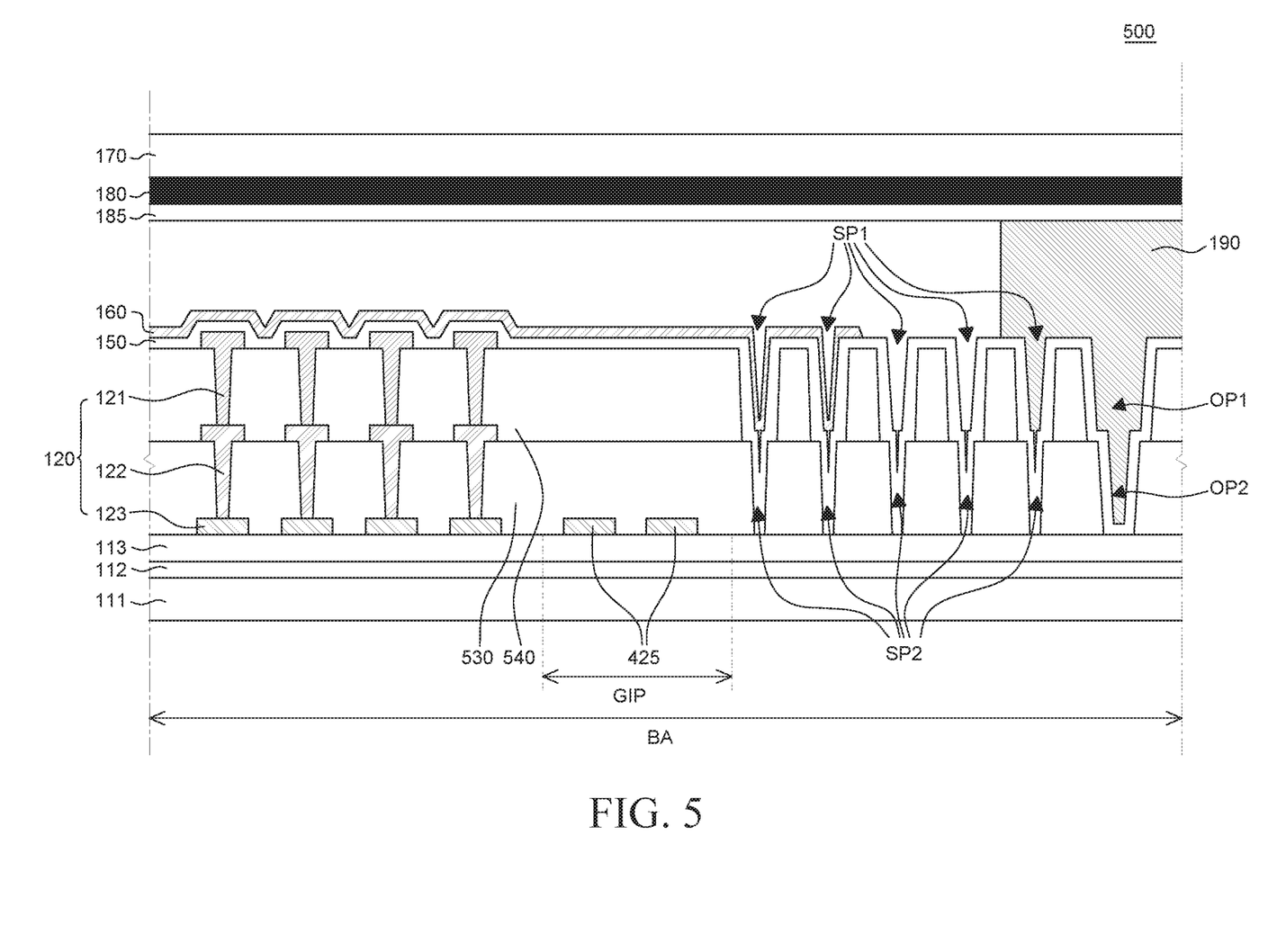
FIG. 5 is a schematic cross-sectional view provided to explain a liquid crystal display device according to still another exemplary embodiment of the present disclosure.

FIG. 5 is a schematic cross-sectional view provided to explain an LCD device according to still another exemplary embodiment of the present disclosure. An LCD device 500 according to still another exemplary embodiment of the present disclosure is substantially the same as the LCD device 400 according to yet another exemplary embodiment of the present disclosure as illustrated in FIG. 4 except that a step is intentionally formed between a lateral surface of the upper slit pattern SP1 and a lateral surface of the lower slit pattern SP2 and a step is intentionally formed between a lateral surface of the upper opening OP1 and a lateral surface of the lower opening OP2. Therefore, the redundant description thereof will be omitted.

Referring to FIG. 5, a step (or other type of uneven portion) is formed between the lateral surface of the upper slit pattern SP1 and the lateral surface of the lower slit pattern SP2, and a step (or unevenness) is formed between the lateral surface of the upper opening OP1 and the lateral surface of the lower opening OP2. That is, the upper slit pattern SP1 and the lower slit pattern SP2 may be formed to have different widths, and the upper opening OP1 and the lower opening OP2 may be formed to have different widths. For example, a lower insulation layer 530 may be formed so as to cover the third metal line 123 and contact holes through which the third metal line 123 is partially exposed may be formed. During this process, the lower slit patterns SP2 and the lower opening OP2 may be formed. That is, an exposure process and an etching process are performed using a full-tone mask through which an area corresponding to the contact holes, the lower slit patterns SP2 and the lower opening OP2 is wholly exposed. Thus, the contact holes through which the third metal line 123 is exposed may be formed simultaneously with the lower slit patterns SP2 and the lower opening OP2 through which the interlayer insulation layer 113 is exposed.

Then, the second metal line 122 connected to the third metal line 123 is formed, and an upper insulation layer 540 is formed so as to cover the second metal line 122. Then, contact holes through which the second metal line 122 is partially exposed may be formed. The upper slit patterns SP1 and the lower slit patterns SP2 may be formed simultaneously while the contact holes are formed. Specifically, the upper insulation layer 540 may be exposed using a full-tone mask through which an area corresponding to the contact holes, the upper slit patterns SP1 and the upper opening OP1 is wholly exposed. Then, the upper insulation layer 540 may be etched so as to simultaneously form the contact holes through which the second metal line 122 is exposed, the upper slit patterns SP1 corresponding to the lower slit patterns SP2, and the upper opening OP1 corresponding to the lower opening OP2. In this case, the lower slit pattern SP2 and the lower opening OP2 may be formed to have different widths from the upper slit pattern SP1 and the upper opening OP1, respectively. For example, a width of a lower part of the upper slit pattern SP1 may be greater than a width of an upper part of the lower slit pattern SP2. Further, a width of a lower part of the upper opening OP1 may be greater than a width of an upper part of the lower opening OP2. In this case, it is possible to minimize a residual film of a first metal material which may be generated during formation of the first metal line 121. Specifically, the first metal line 121 may be formed by depositing the first metal material so as to cover the entire top surface of the upper insulation layer 540 and then patterning the first metal material. If only a micro step (or relatively a small degree of unevenness) is present between the lateral surface of the upper slit pattern SP1 and the lateral surface of the lower slit pattern SP2, the first metal material deeply deposited along the lateral surfaces of the upper slit pattern SP1 and the lower slit pattern SP2 may not be readily patterned. In this case, a residual film of the non-patterned first metal material may remain on the lateral surfaces of the upper slit pattern SP1 and the lower slit pattern SP2. However, if a step (or unevenness) is intentionally formed between the lateral surface of the upper slit pattern SP1 and the lateral surface of the lower slit pattern SP2, a width of the upper slit pattern SP1 is generally increased. Therefore, the first metal material may be more easily patterned and the residual film of the first metal material may be minimized.

In the LCD device 500 according to still another exemplary embodiment of the present disclosure, a step (or uneven portion) is intentionally formed between the lateral surface of the upper slit pattern SP1 and the lateral surface of the lower slit pattern SP2. Further, a step (or uneven portion) is intentionally formed between the lateral surface of the upper opening OP1 and the lateral surface of the lower opening OP2. In this case, a width of the lower part of the upper slit pattern SP1 is greater than a width of the upper part of the lower slit pattern SP2, and a width of the lower part of the upper opening OP1 is greater than a width of the upper part of the lower opening OP2. Therefore, it is possible to minimize a residual film of the first metal material which may be generated during formation of the first metal line 121. Further, a contact area of the sealant 190 with respect to the upper insulation layer 540 and the lower insulation layer 530 may be further increased due to the step intentionally formed between the lateral surface of the upper opening OP1 and the lateral surface of the lower opening OP2. Thus, the adhesion of the sealant 190 may be improved.

The exemplary embodiments of the present disclosure can also be described as follows:

According to an aspect of the present disclosure, a liquid crystal display device includes: a driving circuit, a lower insulation layer, an upper insulation layer, and an inorganic insulation layer. The driving circuit is disposed in a bezel area on a lower substrate. The lower insulation layer includes a lower opening through which an inorganic layer on the lower substrate is exposed and is disposed at an outer side of the lower substrate than the driving circuit. The upper insulation layer is disposed on the lower insulation layer and includes an upper opening corresponding to the lower opening. The inorganic insulation layer is disposed on the upper insulation layer and in direct contact with the inorganic layer on the lower substrate so as to minimize damage to the driving circuit caused by infiltration of moisture from the outside.

According to another feature of the present disclosure, the liquid crystal display device may further include: a common electrode located at the inner side of the lower substrate than the lower opening and the upper opening; a first metal line between the inorganic insulation layer and the upper insulation layer configured to receive a touch signal from the common electrode; a second metal line between the upper insulation layer and the lower insulation layer configured to reduce a resistance of the first metal line as a result of being connected to the first metal line; and a third metal line between the lower insulation layer and the lower substrate configured to reduce a resistance of the second metal line as a result of being connected to the second metal line.

According to yet another feature of the present disclosure, the liquid crystal display device may further include: an upper substrate facing the lower substrate; a sealant between the upper substrate and the lower substrate configured to seal the upper substrate and the lower substrate; and an alignment layer on the inorganic insulation layer. The upper insulation layer may further include an upper slit pattern at an inner side of the lower substrate than the upper opening configured to control a spread of the alignment layer and the sealant.

According to an aspect of the present disclosure, a liquid crystal display device includes: a lower substrate, a lower insulation layer, an upper insulation layer, an inorganic insulation layer, a touch electrode, a first metal line, a second metal line, a third metal line, and a driving circuit. The lower substrate includes an active area and a bezel area. The lower insulation layer includes a lower opening through which an inorganic layer on the lower substrate is exposed and is disposed in the bezel area. The upper insulation layer is disposed on the lower insulation layer and includes an upper opening corresponding to the lower opening. The inorganic insulation layer is disposed on the upper insulation layer and in direct contact with the inorganic layer on the lower substrate and exposed through the upper opening and the lower opening. The touch electrode is disposed in the active area on the lower substrate. The first metal line is disposed between the inorganic insulation layer and the upper insulation layer in the bezel area and electrically connected to the touch electrode. The second metal line is disposed between the upper insulation layer and the lower insulation layer in the bezel area and connected to the first metal line. The third metal line is disposed between the lower insulation layer and the lower substrate in the bezel area and connected to the second metal line. The driving circuit is located at an outer side than the first metal line but is located at an inner side than the lower opening in the bezel area.

According to another feature of the present disclosure, at least one of the first metal line, the second metal line, and the third metal line may be extended and electrically connected to a touch pad positioned in the bezel area.

According to yet another feature of the present disclosure, the lower opening and the upper opening may be extended along an edge of the bezel area so as to be spaced from an area where the first metal line, the second metal line, and the third metal line are extended.

According to yet another feature of the present disclosure, the liquid crystal display device may further include: an upper substrate facing the lower substrate; a sealant covering the upper opening of the upper insulation layer and configured to seal the upper substrate and the lower substrate; and an alignment layer on the inorganic insulation layer. The upper insulation layer may further include an upper slit pattern at an inner side of the lower substrate than the upper opening.

According to still another feature of the present disclosure, the alignment layer may be partially overlapped with the upper slit pattern and may be separated from the sealant.

According to still another feature of the present disclosure, at least one of the third metal line and the second metal line may be overlapped with the upper slit pattern, and the first metal line may be separated from the upper slit pattern.

According to still another feature of the present disclosure, the lower insulation layer may further include a lower slit pattern corresponding to the upper slit pattern, and the first metal line, the second metal line, and the third metal line may be separated from the upper slit pattern and the lower slit pattern.

According to still another feature of the present disclosure, a step may be present between a lateral surface of the upper slit pattern and a lateral surface of the lower slit pattern.

According to still another feature of the present disclosure, a step may be present between a lateral surface of the upper opening and a lateral surface of the lower opening.

In accordance with the foregoing, the inventors of the present disclosure recognized that as a bezel area is reduced, a driving circuit may be easily exposed to moisture and an overlap between a sealant and an alignment layer may cause a decrease in adhesion of the sealant. Further, the inventors of the present disclosure recognized that in an in-cell touch liquid crystal display device, as a width of a touch line is reduced, a touch signal may be delayed. Accordingly, the inventors of the present disclosure newly developed a liquid crystal display device that addresses such issues. In such newly developed liquid crystal display device, an inorganic layer of a lower substrate exposed through an upper opening and a lower opening in direct contact with an inorganic insulation layer so as to minimize infiltration of moisture. Further, in such liquid crystal display device, spreading widths of an alignment layer and a sealant are controlled by using an upper slit pattern so as to minimize an overlap between the sealant and the alignment layer. Furthermore, in such liquid crystal display device, metal lines disposed on different planes are connected to each other, and, thus, a touch line has a sufficiently low resistance with a small width.

According to the present disclosure, an inorganic layer of a lower substrate exposed through a lower opening and an upper opening is in direct contact with an inorganic insulation layer. Thus, it is possible to minimize infiltration of moisture from the outside and thus possible to minimize erosion of a driving circuit caused by the moisture from the outside.

Also, spreading widths of an alignment layer and a sealant are controlled using an upper slit pattern. Thus, it is possible to suppress an overlap between the alignment layer and the sealant and thus possible to minimize a decrease in adhesion of the sealant caused by the overlap between the alignment layer and the sealant.

Further, a second metal line disposed between a lower insulation layer and an upper insulation layer and a third metal line disposed on the upper insulation layer are connected to a first metal line. Thus, it is possible to reduce a width of a touch line while maintaining a resistance of the touch line.

It will be apparent to those skilled in the art that various modifications and variations can be made in the liquid crystal display device of the present disclosure without departing from the spirit or scope of the disclosure. Thus, it is intended that the present disclosure cover the modifications and variations of this disclosure provided they come within the scope of the appended claims and their equivalents.

What is claimed is:

1. A liquid crystal display device, comprising:
   a driving circuit in a bezel area on a lower substrate;
   a lower insulation layer including a lower opening through which an inorganic layer on the lower substrate is exposed and located at an outer side of the lower substrate than the driving circuit;
   an upper insulation layer on the lower insulation layer, the upper insulation layer including an upper slit pattern and an upper opening corresponding to the lower opening;
   an inorganic insulation layer on the upper insulation layer and in direct contact with the inorganic layer on the lower substrate and sidewalls of the upper and lower openings;
   an upper substrate facing the lower substrate;
   a sealant between the upper substrate and the lower substrate configured to seal the upper substrate and the lower substrate; and
   an alignment layer on the inorganic insulation layer,
   wherein the alignment layer is spaced from the sealant and not overlapped with the sealant; and
   wherein the upper slit pattern overlaps with the driving circuit.

2. The liquid crystal display device according to claim 1, further comprising:
   a common electrode located at an inner side of the lower substrate than the lower opening and the upper opening;
   a first metal line between the inorganic insulation layer and the upper insulation layer configured to receive a touch signal from the common electrode;
   a second metal line between the upper insulation layer and the lower insulation layer configured to reduce a resistance of the first metal line as a result of being connected to the first metal line; and
   a third metal line between the lower insulation layer and the lower substrate configured to reduce a resistance of the second metal line as a result of being connected to the second metal line.

3. The liquid crystal display device according to claim 2, further comprising:
   wherein the upper slit pattern is configured to control a spread of the alignment layer and the sealant.

4. A liquid crystal display device, comprising:
   a lower substrate including an active area and a bezel area;
   a lower insulation layer including a lower opening through which an inorganic layer on the lower substrate is exposed and in a bezel area;
   an upper insulation layer on the lower insulation layer, the upper insulation layer including an upper slit pattern and an upper opening corresponding to the lower opening;
   an inorganic insulation layer on the upper insulation layer and in direct contact with sidewalls of the upper and lower openings and the inorganic layer that is on the lower substrate and exposed through the upper opening and the lower opening;
   a touch electrode in the active area on the lower substrate;
   a first metal line between the inorganic insulation layer and the upper insulation layer in the bezel area, the first metal line electrically connected to the touch electrode;
   a second metal line between the upper insulation layer and the lower insulation layer in the bezel area, the second metal line connected to the first metal line;
   a third metal line between the lower insulation layer and the lower substrate in the bezel area, the third metal line connected to the second metal line;
   a driving circuit located at an outer side than the first metal line but located at an inner side than the lower opening in the bezel area;
   an upper substrate facing the lower substrate;
   a sealant covering the upper opening of the upper insulation layer and configured to seal the upper substrate and the lower substrate; and
   an alignment layer on the inorganic insulation layer, wherein the alignment layer is spaced from the sealant and not overlapped with the sealant,
   wherein a depth of the upper slit pattern is smaller than a depth of the upper opening such that the lower insulation layer is not exposed by the upper slit pattern and at least one of the second metal line and the third metal line is between the upper slit pattern and the inorganic layer,
   wherein the first metal line is extended in the bezel area to be connected to a touch pad,
   wherein the upper slit pattern is located between the first metal line and the upper opening, and
   wherein the lower and upper openings are extended along an edge of the bezel area, except an area where the first metal line is extended, to surround a lateral surface of the driving circuit.

5. The liquid crystal display device according to claim 4, wherein at least one of the first metal line, the second metal line, and the third metal line is extended and electrically connected to a touch pad in the bezel area.

6. The liquid crystal display device according to claim 5, wherein the lower opening and the upper opening are extended along the edge of the bezel area so as to be spaced from an area where the first metal line, the second metal line, and the third metal line are extended.

7. The liquid crystal display device according to claim 6, wherein the upper slit pattern is configured to control a spread of the alignment layer and the sealant.

8. The liquid crystal display device according to claim 7, wherein the alignment layer is partially overlapped with the upper slit pattern and is separated from the sealant.

9. The liquid crystal display device according to claim 7, wherein at least one of the third metal line and the second metal line is overlapped with the upper slit pattern, and
   the first metal line is separated from the upper slit pattern.

10. The liquid crystal display device according to claim 7, wherein the lower insulation layer further includes a lower slit pattern corresponding to the upper slit pattern, and
    the first metal line, the second metal line, and the third metal line are separated from the upper slit pattern and the lower slit pattern.

11. The liquid crystal display device according to claim 10, wherein a step is present between a lateral surface of the upper slit pattern and a lateral surface of the lower slit pattern.

12. The liquid crystal display device according to claim 11, wherein a step is present between a lateral surface of the upper opening and a lateral surface of the lower opening.

13. The liquid crystal display device according to claim 3, wherein:
    a depth of the upper slit pattern is smaller than a depth of the upper opening such that the lower insulation layer is not exposed by the upper slit pattern.

14. The liquid crystal display device according to claim 4, wherein the first metal line is absent between the upper slit pattern and the inorganic layer.

* * * * *